United States Patent [19] [11] 4,342,533
// Hane [45] Aug. 3, 1982

[54] RECIPROCAL METHOD AND APPARATUS FOR TRANSFERRING VEHICLE BATTERIES

[76] Inventor: Dale R. Hane, 110 Union St., Sunbury, Pa. 17801

[21] Appl. No.: 103,617

[22] Filed: Dec. 14, 1979

[51] Int. Cl.³ .................. B65G 67/02; B60L 11/18
[52] U.S. Cl. .................. 414/396; 104/34; 180/68.5; 414/400
[58] Field of Search ........ 414/400, 395, 373, 390, 414/396, 398, 585; 180/68.5; 104/34; 105/50, 51

[56] References Cited

U.S. PATENT DOCUMENTS

| | | | |
|---|---|---|---|
| 434,863 | 8/1890 | Corning | 104/34 |
| 666,303 | 1/1901 | Condict | 104/34 |
| 900,359 | 10/1908 | Doty | 104/34 |
| 3,708,028 | 1/1973 | Hafer | 180/68.5 R |
| 4,227,463 | 10/1980 | Pfleger | 104/34 |

FOREIGN PATENT DOCUMENTS

| | | | |
|---|---|---|---|
| 2410102 | 9/1975 | Fed. Rep. of Germany | 180/68.5 |
| 972365 | 1/1951 | France | 180/68.5 |

*Primary Examiner*—F. J. Bartuska
*Attorney, Agent, or Firm*—Robert S. Smith

[57] ABSTRACT

Apparatus and the method for transferring heavy elongated batteries into and out of an electrically powered vehicle. Elongated loading stations are positioned in aligned relationship with an elongated battery chamber which extends completely through a vehicle. A battery in a first loading station is pushed into the chamber in the vehicle causing a battery in that chamber to be pushed into the other loading station.

3 Claims, 5 Drawing Figures

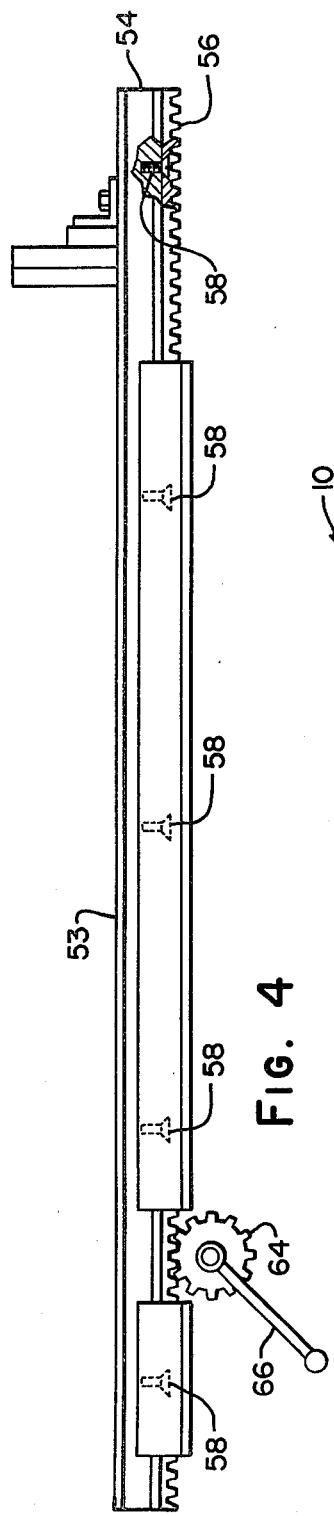
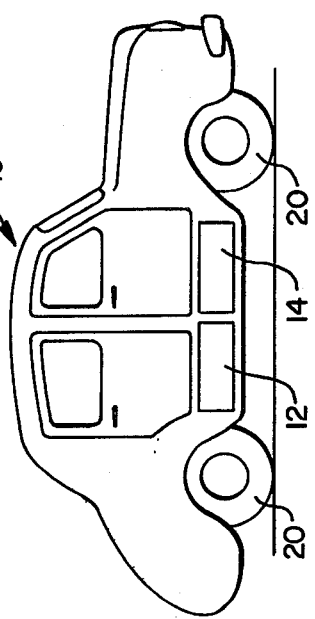
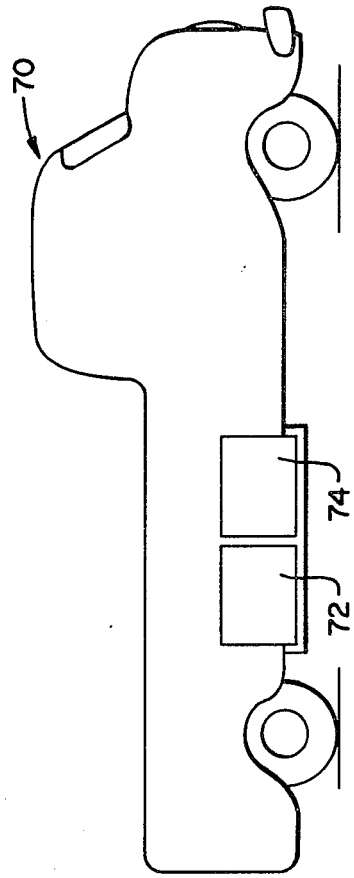
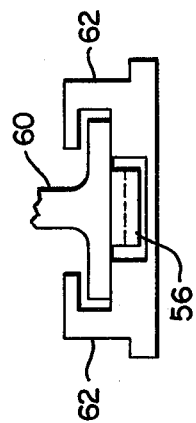
FIG. 4
FIG. 1
FIG. 2
FIG. 5

RECIPROCAL METHOD AND APPARATUS FOR TRANSFERRING VEHICLE BATTERIES

BACKGROUND OF THE INVENTION

The invention relates to an electric motor powered vehicle and particularly to a method and apparatus for changing a battery in such a vehicle. Electrically powered vehicle are of great interest because of the high and still increasing prices for petroleum products as well as the shortage of such products. A major advantage of electrically powered vehicles is that the electrical energy may be generated by burning coal or nuclear energy or other sources which are not dependent upon petroleum. The primary obstacle to increased utilization of such vehicles has been the limited range which is possible with existing batteries. Various new battery developments are making greater ranges possible. However, there is still substantial constraint on the user of such vehicles. The user typically may drive about 45 miles and then must return to a charging station and wait a substantial period of time before again moving his vehicle.

It is an object of the invention to provide an apparatus and method which will permit the rapid and convenient interchange of batteries in a vehicle so that a fully charged battery is provided.

It is another object of the invention to provide a method and apparatus which will be practical for use at commercial stations such as the conventional service station so that the operator of an electrically powered vehicle is not constrained to return to home base to recharge his battery but instead may go to such a station and exchange his battery for another fully charged battery. It is another object of the invention to provide apparatus which is simple and easy to construct.

Yet another object of the invention is to provide apparatus which will enable the easy exchange of battery assemblies alongside a highway for those occasions when a battery assembly runs down when the vehicle is away from a normal battery assembly replacement station.

SUMMARY OF THE INVENTION

It has now been found that these and other objects of the invention may be attained by use of a method which includes providing first and second elongated loading stations in axially aligned relationship. A vehicle is provided having an elongated battery chamber extending completely through the vehicle and that battery chamber is positioned in aligned relationship with the first and second elongated loading stations. An elongated battery asembly disposed in the first loading station is moved axially into the battery chamber to force a second battery out of the battery chamber and into the second loading station. In one form of the invention each loading station is provided with some means to urge a battery from that loading station into the battery chamber and accordingly a battery from the battery chamber into the other loading station. In one form of the invention the method and apparatus corresponding thereto includes a rack disposed on the bottom of the battery assembly which cooperates with a pinion to urge the battery assembly from one position to another. The method and apparatus further includes means for varying the elevation of the loading stations such as by one or more hydraulic jacks. In one form of the invention a plurality of loading stations are positioned on rails and may be moved in a direction which is normal to the axis of the battery compartment and the loading stations so that the first loading station may be moved away from alignment with the vehicle and another loading station be positioned in the identical position. Similarly the second loading station may also be moved in the same general direction and another loading station positioned in axial alignment with the vehicle battery chamber.

In one form of the invention at least one pair of loading stations, that is, one loading station on each side of the vehicle with which they cooperate are fixed together so that they may be moved on such rails with their axially aligned relationship maintained.

BRIEF DESCRIPTION OF THE DRAWING

The invention will be better understood by reference to the accompanying drawing in which:

FIG. 1 is an elevational view of an electrically powered automobile;

FIG. 2 is an elevational view of a service vehicle intended to allow roadside exhange of heavy batteries within an automobile.

FIG. 4 is an elevational view of a rack and pinion assembly for moving a battery assembly; and FIG. 5 is an end elevational view of apparatus similar to that shown in FIG. 4 and illustrates the rack and the supports for the surface on which the rack is mounted.

DESCRIPTION OF A PREFERRED EMBODIMENT

Figure 3:
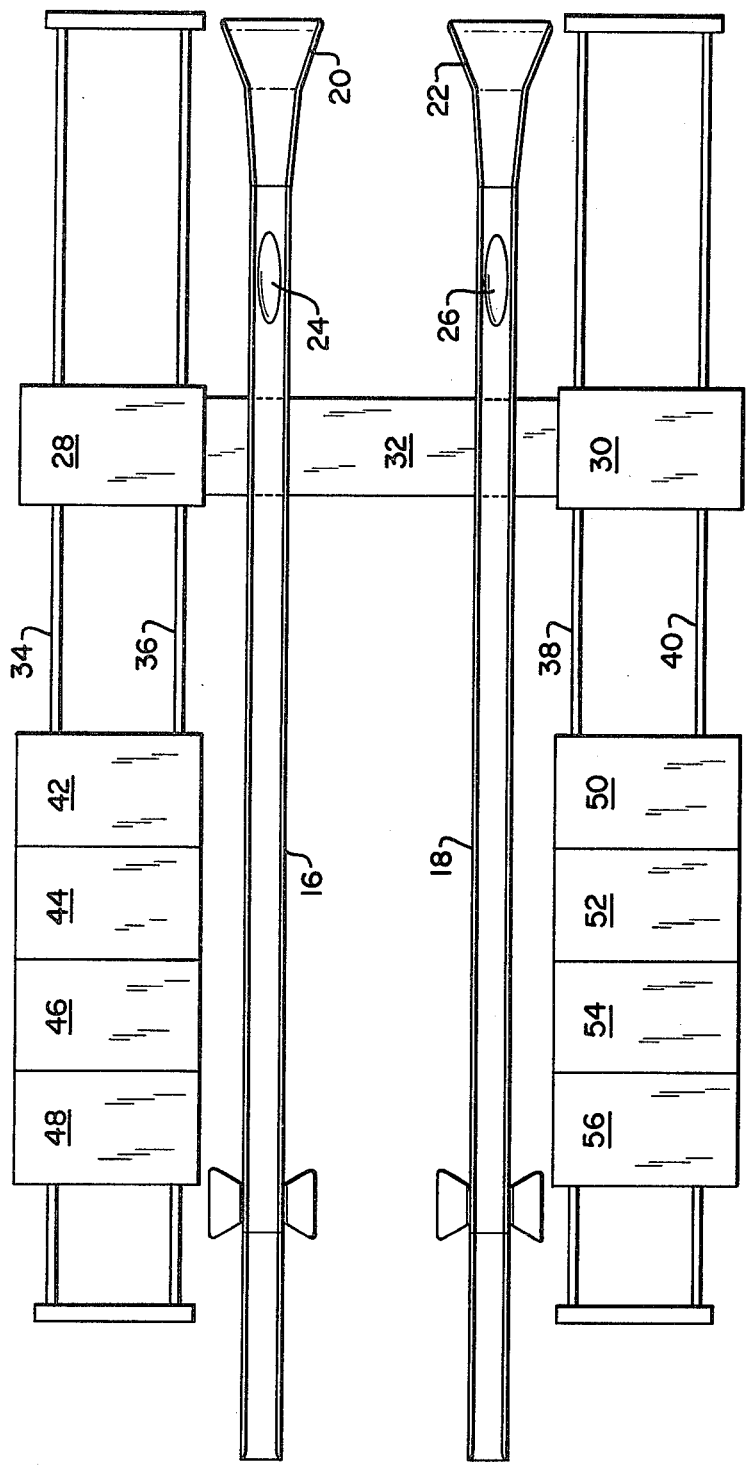
FIG. 3 is a partially schematic plan view of a plurality of loading stations arranged to cooperate with a vehicle such as that shown in FIG. 1.

Referring now to FIGS. 1 and 3 there is shown a vehicle 10 which is provided with first and second battery chambers 12, 14. In various embodiments only a single chamber will be used. Preferably the chambers will be disposed above the frame of the vehicle and beneath the feet of the passengers in the automobile. Chambers 12, 14 extend completely through the vehicle and are provided with doors (not shown) at each axial extremity to cover the chamber. It will be understood that in other embodiments of the invention battery chambers may extend the length of the car although the transverse orientation is preferred. It is essential to the practice of the invention that the vehicle have a chamber which extends completely through the vehicle so that a battery assembly may be inserted on one side and the used or discharged battery assembly removed on the other side.

Referring now specifically to FIG. 3 there is shown a battery interchange apparatus in accordance with one form of the invention. The apparatus includes ramps 16, 18 which cooperate with the wheels 20 of a vehicle. The ramps 16, 18 are more specifically raised above the generally planar floor suface on which they rest and have flared ends 21, 22 to make it easier for a driver to enter the ramps in the same way that ramps for hydraulic hoists are customarily flared. Recessed surfaces 24, 26 are provided in the ramps 16, 18 to provide a fixed axial position for a motor vehicle on the ramps. A first loading station 28 is disposed in aligned relationship to a second loading station 30 by means for cross member 32 which are disposed intermediate the ramps 16, 18 and the floor on which the ramps rest. The loading station 28 is carried on rails 34, 36. Similarly loading station 30 is carried on rails 38 and 40. The manner in which the loading stations are carried on the rails allows the movement of loading stations in a direction which is generally parallel to the ramps 16, 18. Because of the cross member 32 the loading stations 28 and 30 move along the rails on which they are carried simultaneously with the alignment therebetween maintained. For some applications each loading station will be provided with either mechanical or hydraulic means for varying the elevation of the loading station to position the loading station more precisely with respect to the battery compartment within a vehicle positioned on the ramps 16, 18. Hydraulic apparatus for positioning the loading stations may include a plurality of discrete pumps which are each provided with a separate cylinder and piston. In other forms of the invention a single pump will feed a plurality of cylinder and piston assemblies. It will be understood that the cross member 32 has the important function of maintaining the alignment of the loading stations 28 and 30 so that if either one is aligned with the battery compartment of a vehicle the other will automatically be properly aligned.

Also carried on the rails 34 and 36 are a plurality of additional loading stations 42, 44, 46 and 48. Similarly loading stations 50, 52, 54 and 56 are also carried on rails 38 and 40. In some forms of the invention connecting members will be provided to connect opposed pairs of loading station such as 42 and 50.

Referring now to FIGS. 4 and 5 there is shown a portion of the apparatus in accordance with one form of the invention. A planar surface 53 for holding a battery assembly (not shown) is provided on the elongated member 54 which has a rack gear 56 fixed to it by means of bolts 58 (two shown). The elongated member 54 is provided in one form of the invention with feet 60 which are carried within L-shaped member 62 which are part of each loading station. It will be understood that the feed 60 cooperate with rollers (not shown) which are part of the vehicle. A pinion 64 is part of each loading station. That pinion 64 cooperates with the rack 56 so that upon rotation of the pinion the rack is moved axially either toward or away from the vehicle in which a battery assembly is being changed. In one form of the invention a crank 66 is provided to manually operate the pinion 64. In other forms of the invention an electric motor may be utilized to drive the pinion 64. In operation a vehicle is positioned on the ramp 16, 18 with two of the wheels 20 positioned in the recessed areas 24, 26. Any fine adjustment in the positioning of the loading stations 28 and 30 with respect to the battery chambers is achieved by moving the stations 28 and 30 along the rails on which they are carried or by changing the elevation. It is preferable, however, to have a relatively standardized motor vehicle so that such further adjustments are not necessary. In the event that an industry standard can not be achieved then the additional flexibility inherent in the adjustments are essential. With the loading stations 28 and 30 aligned with the battery chamber 12 of a vehicle, the loading station in which a fully charged battery assembly is located is moved axially by driving the pinion 64 to urge a battery assembly against another battery assembly which is located in the battery chamber 12 and causes it to be pushed out into the opposite loading station while the first battery chamber is being simultaneously loaded with another battery. Depending upon the weight of the individual battery assembly it may be desirable to brace the position of the vehicle such as by positioning pneumatically controlled supports (not shown) against the frame of the vehicle so that if there is any tendency for the body to shift as the batteries are being transferred the braces will insure that no such shift occurs. After the transfer has been accomplished and the usual connections to the battery have been completed the vehicle may be moved along the ramps 16 and 18 (to the left as viewed) and out onto the street again. Thereafter the loading stations 28 and 30 may be moved to the right of the position which is shown and a new pair of loading stations such as 42 and 50 may be moved up to a position where they will be aligned with another vehicle which will be positioned with two of the wheels 20, 20 resting in the surfaces 24, 26. Obviously the battery which was removed from the first vehicle will be immediately connected with a battery charger so that the charging cycle may begin. In a manner which will be obvious to those skilled in the art the remaining loading stations will be used to exchange additional battery assemblies and additional vehicles.

It is anticipated that some motor vehicles will become stranded along highways or in parking lots and that it will be highly desirable to have a capability of exchanging a battery assembly within such a vehicle without the necessity for towing the vehicle back to a station which has the apparatus such as that shown in FIG. 3.

Referring now to FIG. 2 there is shown a service vehicle 70 which is provided with first and second battery chambers 72 and 74. Ordinarily the vehicle will be dispatched to the scene of the car or other vehicle which has a run down battery with one of the two chambers 72, 74 filled with a freshly charged battery. The vehicle 70 will be positioned alongside the broken down vehicle and by means of the same rack and pinion type assembly shown in FIG. 4 the discharged battery assembly will be drawn out of the vehicle and placed in the chamber 74. Thereupon the vehicle 70 will be moved (if necessary) slightly forward or backward to align the chamber 72 with the desired battery chamber of the vehicle 10 and again with the same general rack and pinion type apparatus the fully charged battery assembly will be positioned within the chamber 12 of vehicle 10. In various forms of the invention the vehicle battery chamber may extend from the front of the car to the back of the car instead of across the car as is shown in the drawing. Such an arrangement is ordinarily less preferred since it is more difficult to position the car in alignment with two loading stations which extend substantially up to the extremities of the battery chamber. It will be seen that the objects of the invention including the object of permitting the rapid interchange of batteries without the necessity of waiting for charging time or the limitation on the owner inherent in having to return to a home base for charging are achieved.

In one form of the invention the apparatus may include a molded fiberglass housing enclosing a plurality of batteries which together form a battery pack. The fiberglass will provide electrical insulation, prevent spillage of battery acid, and provide thermal insulation. The fiberglass housing is also advantageous in containing batteries that may experience sudden violent failures.

An advantage of the method and apparatus in accordance with the invention (and particularly FIG. 3) is that the vehicle in which a battery is being replaced will experience no vertical shift during the battery exchange.

Having thus described my invention I claim:

1. Apparatus for transferring an associated vehicle battery from an associated vehicle having an elongated battery chamber which extends between two extremities of the vehicle which comprises:
- a loading station which includes first means for carrying an associated battery;
- means for urging said means for carrying toward an associated vehicle, said means for urging comprising cooperating rack and pinion gears;
- an unloading station which includes second means for carrying an associated battery;
- means for connecting and for mounting said loading and unloading stations for movement with respect to the associated vehicle in a direction which is generally transverse to the axis of the battery chamber thereof; and said means for connecting comprises a cross member which extends intermediate said loading and unloading stations.

2. The apparatus as described in claim 1:
further including a plurality of additional loading stations and each of said loading stations is carried on a pair of tracks for movement in a direction which is generally transverse to the axis of the battery chamber of the associated vehicle.

3. The apparatus as described in claim 2:
further including a plurality of additional unloading stations and each of said unloading stations is carried on a pair of tracks for movement in a direction which is generally transverse to the axis of the battery chamber of the associated vehicle.

* * * * *